United States Patent [19]

Debortoli et al.

[11] Patent Number: 4,911,662
[45] Date of Patent: Mar. 27, 1990

[54] DISTRIBUTION FRAME FOR TELECOMMUNICATIONS CABLE

[75] Inventors: George Debortoli, Ottawa; Laurence A. J. Beaulieu, Kanata; Brian T. Osborne, Kanata, all of Canada

[73] Assignee: Northern Telecom Limited, Montreal, Canada

[21] Appl. No.: 379,140

[22] Filed: Jul. 13, 1989

Related U.S. Application Data

[63] Continuation-in-part of Ser. No. 286,902, Dec. 20, 1988, abandoned.

[51] Int. Cl.⁴ ............................................. H01R 13/72
[52] U.S. Cl. ..................................... 439/719; 361/428; 361/429; 379/329
[58] Field of Search ............................... 361/428, 429; 379/326–329; 439/719

[56] References Cited

U.S. PATENT DOCUMENTS

| | | | |
|---|---|---|---|
| 4,160,880 | 7/1979 | Grey | 361/428 |
| 4,278,315 | 7/1981 | Osborne | 439/719 |
| 4,366,527 | 12/1982 | Bell | 361/428 |

Primary Examiner—Gary F. Paumen
Attorney, Agent, or Firm—R. J. Austin

[57] ABSTRACT

Termination shelf for telecommunications cable with mounting positions for conductor connector devices. The mounting positions are accessible from one side of the shelf for insertion of the connector devices. Also a guide is provided to enable a flexible transmission element to be inserted into the tray from the same side as for shelf insertion, the guide being shaped to guide the transmission element towards a remote side of the frame and then to guide the trasmission element in the opposite direction through the mounting position. Frontal loading of the connector devices and of incoming conductors is thereby a use feature with the termination shelf.

7 Claims, 4 Drawing Sheets

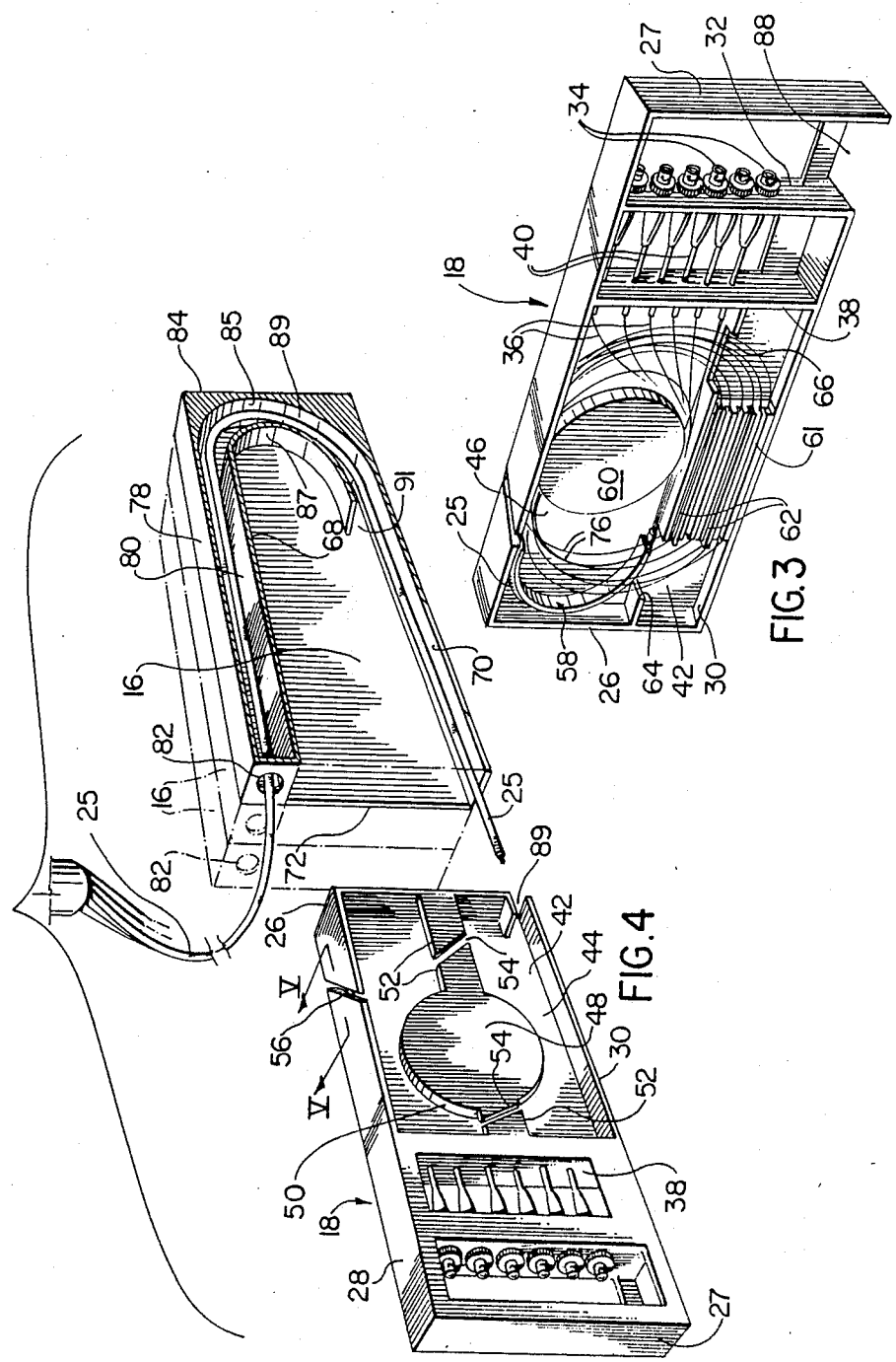

DISTRIBUTION FRAME FOR TELECOMMUNICATIONS CABLE

CROSS-REFERENCE TO RELATED APPLICATION

This invention relates to a distribution frame for telecommunications cable and is a Continuation-In-Part of patent application Ser. No. 286,902 filed Dec. 20, 1988 now abandoned.

BACKGROUND OF THE INVENTION

In the electrical telecommunications industry, an incoming telecommunications cable enters a customer's premises and the conductors of the incoming cable extend to a distribution frame where they are connected to telecommunications conductors of the customer's internal telecommunications network. The arrangement and design of a distribution frame is such that, for accessibility, the customer's conductors extend into the front of the frame and into connectors to be connected to the conductors of the incoming cable. Frontal access into the distribution frame is most important for the customer, not only for initial connection of conductors of his internal network, but also for removal and repositioning of his conductors to accommodate changes in his own network design accompanied by interchangeability with the incoming conductors at the terminals in the distribution frame. To allow for frontal access of customer's conductors, conductors of the incoming cable extend into the rear of the connectors in the distribution frame. It is conventional practice to pass the incoming conductors along the back or rear of the frame or down through the frame towards the rear. This positioning of the incoming conductors increases the difficulties in directing them each to its specific location for connection into a specific terminal. A typical distribution frame is described in U.S. Pat. No. 4,278,315, granted July 14, 1981 in the name of B. T. Osborne. This patent shows the rear access of incoming conductors to a distribution frame.

In the optical telecommunications field, distribution frames are not provided which connect, at one location, optical fibers of an incoming cable with optical fibers of a customer's internal network.

SUMMARY OF THE INVENTION

The present invention seeks to provide a termination shelf for optical fibers which in use lessens the above positioning problem for incoming conductors and which may be used both in the electrical and optical telecommunications fields. When used in the optical field, such shelves may be used separately from fiber termination frames or may be mounted upon or form a part of such frames. A fiber termination frame may be either a distribution frame for optical fibers or an equipment frame which carries electronic equipment and has at least one termination shelf for incoming optical fibers.

Accordingly, the present invention provides a termination shelf for telecommunications cable comprising a first side and a second side remote from the first side, mounting means for mounting a plurality of conductor connector means in mounting positions in the shelf with access to the mounting positions at said first side, and a plurality of guide means each having first and second in-series guide parts and in each of which: the first guide part extends from the first side towards the second side of the shelf for guiding a flexible telecommunications cable transmission element positioned at the first side along a fixed path through the shelf towards the second side; and the second guide part is in-series with the first guide part to receive the transmission element from the first guide part, the second guide part being curved so as to guide the transmission element along a curved path and then through a corresponding mounting position towards the first side of the shelf.

The termination shelf according to the invention thus operates to enable the telecommunications transmission element to be guided first in one direction through the shelf and then to be returned in the other direction. In a practical sense, where the first side of the termination shelf is positioned to be at a front of a distribution frame, then this enables a cable to be mounted upon the front side of the frame. The telecommunications cable transmission element, which may be the cable or a part of it, is then passed from the front towards the rear of the frame through the guide means of the shelf. The guide means operates to direct the transmission element around the second guide part so that it comes forwardly through the mounting position and is accessible to an operator from the front of the shelf or frame for connection into the connector means. As a result, there is no need for access to the rear of the shelf or frame by the installer and the shelf or frame may conveniently be mounted upon or against a wall thereby saving space. As a further result, the insertion of the transmission element into the shelf is simplified by the use of the guide means thereby avoiding the necessity of the installer to locate the transmission element along a tortuous path to reach the desired mounting position, particularly when mounted in a fiber termination frame.

Alternatively, the shelf is mounted in a distribution frame to extend laterally of the frame so that the two sides of the shelf are spaced in a direction between the sides of the frame.

The termination shelf according to the invention is particularly useful for connecting optical fibers of an incoming optical cable to the optical fibers of a customer's internal telecommunications network. However, it may also be used for frontal positioning and connecting of electrical telecommunications cable into the frame.

The invention also includes a termination shelf for telecommunications cable and a plurality of conductor connector means, the shelf comprising a first side and a second side remote from the first side, and mounting means for mounting the plurality of conductor connector means in mounting positions in the shelf by sliding reception of the conductor connector means into the mounting positions through an access to each of the mounting positions at said first side, the shelf also comprising a plurality of guide means, one for each mounting position, each guide means having first and second in-series guide parts and in each of which: the first guide part extends from the first side towards the second side of the shelf for guiding a flexible telecommunications cable transmission element positioned at the first side and fed into the first guide part, along a fixed path through the shelf towards the second side; and the second guide part is in-series with the first guide part to receive the transmission element from the first guide part, the second guide part being curved so as to guide the transmission element along a curved path and through a corresponding mounting position towards the first side of the shelf.

BRIEF DESCRIPTION OF THE INVENTION

One embodiment of the invention will now be described, by way of example, with reference to the accompanying drawings, in which.

Figures 1, 2:
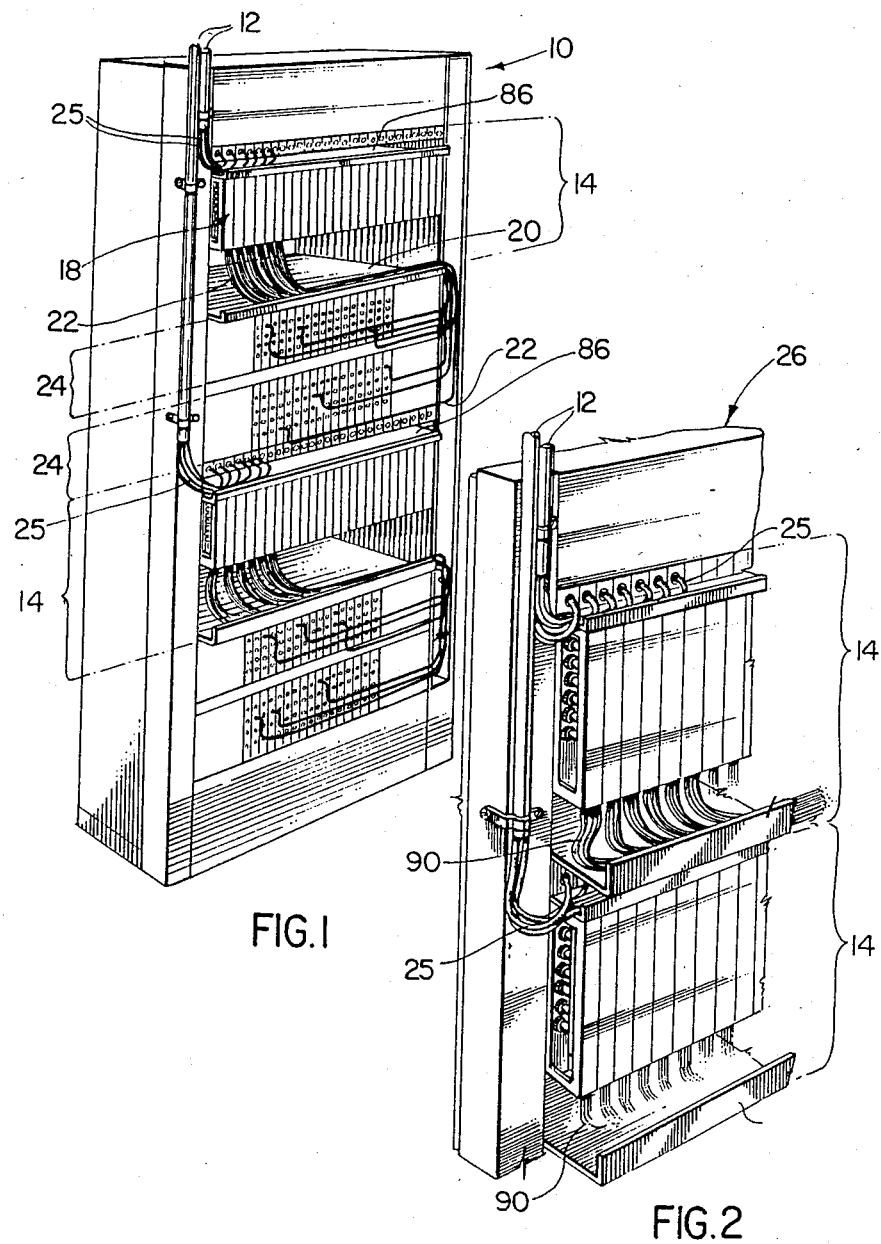
FIG. 1 is an isometric view of an equipment frame, connection tray and flexible optical transmission element assembly including termination shelves forming the embodiment.
FIG. 2 is a view similar to FIG. 1, and to a larger scale, of part of an assembly forming a second embodiment and including a distribution frame.
Figure 5:
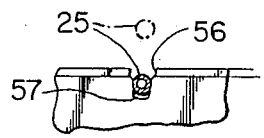
Figure 6:
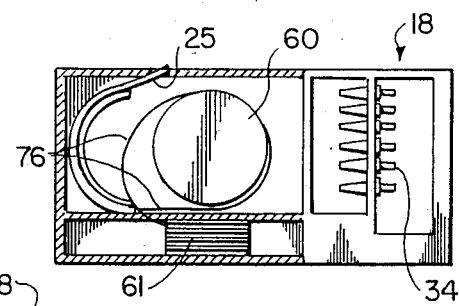
Figure 7:
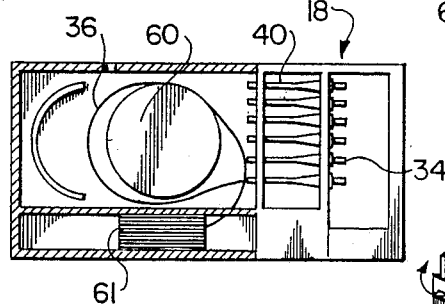
Figure 13:
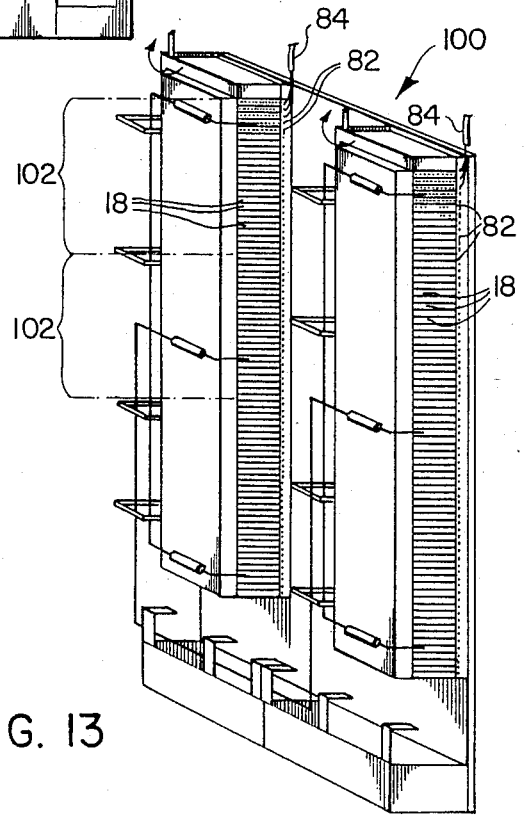
Figure 8:
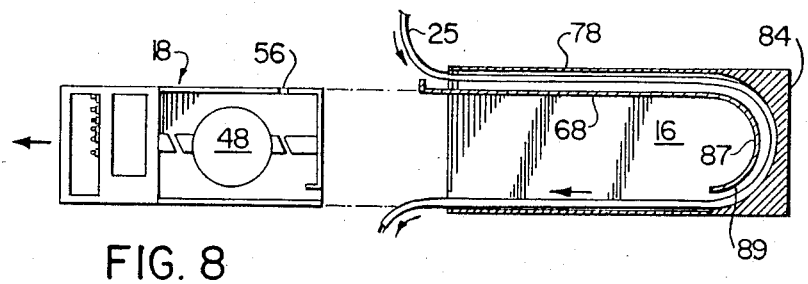
Figure 9:
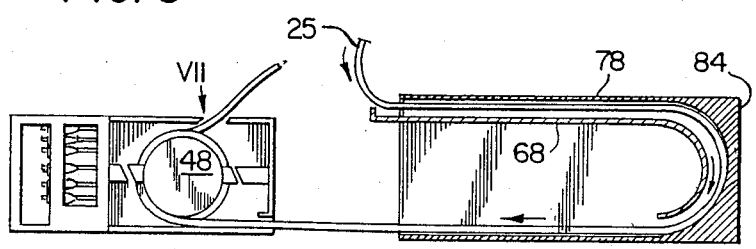
Figure 10:
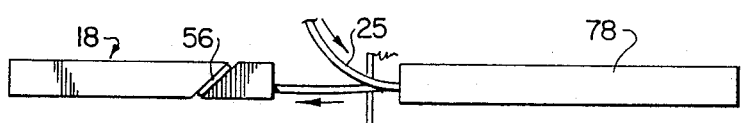
Figure 11:
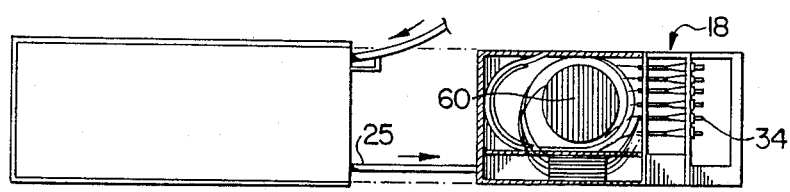
Figure 12:
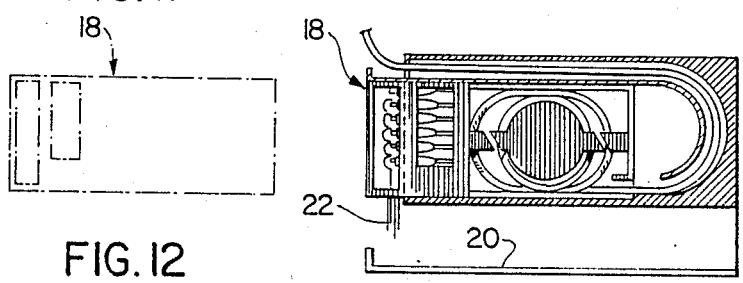

FIG. 3, to a larger scale than FIG. 2, is an isometric view of one side of a tray used in the assembly of FIG. 1 or FIG. 2 and taken in the same direction as FIGS. 1 and 2;

FIG. 4 is an isometric view of the other side of the tray and part of the frame of FIGS. 1 or 2 also shown in section with the tray in a non-operative position relative to the frame;

FIG. 5 is an enlarged cross-sectional view taken along line 'V—V' in FIG. 4;

FIGS. 6 and 7 are side elevational views of a tray onto the side shown in FIG. 3 to illustrate pathways for optical fibers stored by the tray;

FIG. 8, to a smaller scale than FIGS. 3 and 4, is a cross-sectional view through part of the frame of FIGS. 1 or 2 and showing a tray in its non-operative position in a first stage in feeding the transmission element into the frame and tray;

FIG. 9 is a view similar to FIG. 8 showing a second stage in mounting of the transmission element;

FIG. 10 is a view in the direction of arrow X in FIG. 9 to show passage of the transmission element from the housing region into a storage compartment of the tray;

FIG. 11 is a cross-sectional view of the frame and tray in the opposite direction from FIG. 9 with the assembly of transmission elements and of optical fibers completed as shown in FIG. 3;

FIG. 12 is a view similar to FIG. 9 showing the connection tray in its operative position within the frame; and FIG. 13 is a diagrammatic isometric view of another equipment frame using termination shelves of the embodiment.

DESCRIPTION OF THE PREFERRED EMBODIMENT(S)

As shown in FIG. 1, an equipment frame 10 is provided for connecting optical fibers of optical cables 12 with the optical fibers forming the internal telecommunications network on a customer's premises. The equipment frame 10 comprises two fiber termination shelves 14 according to the embodiment, the shelves being vertically spaced apart. Each of the shelves 14 comprises horizontally in-series mounting positions 16 (see FIG. 4) for a plurality of conductor connecting means in the form of connection trays 18. Each shelf may be a detachable unit from frame 10 and may be mounted instead upon any suitable support or within a cabinet. Shelves 14 include trays 20 beneath stations 16 for holding optical patch cords 22 which comprise flexible protective tubes housing individual optical fibers. The patch cords 22 extend to terminals in equipment shelves 24 of the frame 10 for connection to individual optical fibers of the customer's network. The patch cords 22 may be changed in positions so as to alter the connections between the fibers of the incoming cables with the terminals in the equipment shelves 24.

Alternatively, in a distribution frame 26 as shown in FIG. 2, the frame comprises a series of detachable shelves 14 similar to those shown in FIG. 1 but without the addition of different types of shelves such as equipment shelves 24. In FIG. 2, the shelves 14 lie directly one above another.

With the structures of FIGS. 1 and 2, optical fibers contained within flexible protective tubes of optical transmission elements 25 may be connected to connectors in the trays 18, as will be described, for connection to the customer's private internal network. The transmission elements collectively provide the cores of a plurality of cables 12, one for each shelf 14 which will be further discussed below. In FIG. 2, only two cables 12 are shown.

Each of the trays 18 as shown in FIGS. 3 and 4 lies in a vertical plane and has a front end formed by end wall 27 and a rear end formed by end wall 26. At the top and bottom of the tray in the position shown in FIG. 3, extend side walls 28 and 30 between the end walls 27 and 26. Spaced slightly behind the end wall 27 and parallel to it lies another wall 32 which provides mounting positions for a plurality of optical connectors 34 which extend through holes in the wall as shown. These optical connectors form parts of pigtail assemblies which also include bare optical fibers 36 which are disposed within the tray as will be described. An additional wall 38 behind and parallel to the wall 34 is provided to align the fibers with the mounting positions for the connectors, and at this stage the fibers are enshrouded within short protective flexible polymeric tubes 40 which extend from the connectors.

Between the walls 38 and 26 extends a partition wall 42 which separates a housing region 44 for an incoming optical transmission element 25 from a storage compartment 46 for bared optical fibers. As can be seen from FIGS. 3 and 4 the housing region 44 and the storage compartment 46 lie one on each side of the partition 42 between the walls 26, 28, 30 and 38.

Within the housing region, the tray is provided with a minimum bend radius limiting means for the optical transmission element. This minimum bend radius limiting means comprises a short cylindrical member 48 projecting axially from the partition 42 into the housing region. The cylindrical surface 50 of the member 48 is spaced a substantial distance from the walls of the tray to enable the transmission element 25 to be passed around the surface 50 with freedom for substantial lateral movement.

A retaining means is provided for holding the transmission element in the housing region, this retaining means comprising extensions 52 from the walls 26 and 38 and from the member 48, the extensions parallel to but spaced from the partition 42 and defining between them narrow gaps 54 for insertion of the transmission element. The housing region 42 is connected to the storage compartment 46 by an inclined slit 56 formed in the wall 18.

At the rear end of the storage compartment 46 is provided a curved guide 58 for holding the transmission element 25 in curved orientation after it enters the storage compartment so as to direct optical fibers of the optical transmission element along a side of the storage compartment towards the wall 38. Within the storage compartment 46 is disposed a cylindrical member 60 of similar construction to the member 48 and around which bare fibers are to be organized.

At one side of the storage compartment is provided a splice compartment 61 which shares with the storage compartment the space bounded by walls 26, 28, 30 and 38. The splice compartment is provided to house a plurality of splices 62 for optical fibers, the splices to be of conventional structure. An interconnecting space 64 and 66 is provided at each side of the splice compartment 61, these spaces interconnecting the storage compartment and the splice compartment. The storage and splice compartments are provided with a removable cover (not shown) for protecting bare fibers except when an installer or maintenance worker is operating within the compartments.

The remainder of this description relates to the distribution frame 26. It should be understood, however, that the description also relates to the equipment frame 10.

As can be seen particularly from FIGS. 1, 2 and 3, because of the design of each shelf 14, the distribution frame is designed for the frontal acceptance of the incoming optical cables 12 for connection to the connectors 34 of the various trays 18. The cables 12 are secured along a front of the distribution frame and, to enable the fibers of the cables to be passed into the trays 18 and connected with the connectors 34, it is necessary for the fibers to extend forwardly from the rear of the frame. This arrangement will also allow for the trays to be moved between a mounting station 16 and a non-operative position as will be described. As can be seen particularly from FIG. 4, the mounting positions 16 which lie side-by-side in each termination shelf 14, each comprise a means for slidably accepting an associated tray 18. This means comprises parallel horizontally and rearwardly extending upper and lower frame walls 68 and 70 with the wall 30 of the tray slidably engaging the lower wall 70. The walls 68 and 70 define between them at the mounting position 16, a chamber sufficiently large to accept a tray comfortably, and dividing walls 72 are provided between adjacent mounting positions.

Each of the cables 12 extends downwardly along the front of the frame. The sheath and jacket of each cable is removed at an appropriate position to expose the optical transmission elements 25 forming the core of the cable. Each termination shelf 14 includes a guide means for passage of the transmission elements, one for each mounting station 16, so as to guide the transmission elements rearwardly of the frame and then to enable the transmission elements to extend forwardly from a rear region of the frame and out through the front of the frame as required. In respect of each mounting station 16, the guide means comprises a first guide part which is defined by the wall 68 of the frame and a wall 78 slightly spaced above it, so as to define a passage 80 flanked by two side walls 72. An entrance to the passage 80 is provided by a circular hole 82 at the front of the distribution frame. Towards the rear of the distribution frame is provided a second guide part of the guide means. This second guide part comprises an end wall 84 having a forwardly facing semicircular guide surface 85 which is an extension of the wall 78. The second guide part also includes a curved wall 87 forming an extension of the wall 68. The wall 87 is parallel to and spaced from the surface 85 to define a passage 89 therebetween. The guide surface 85 and wall 87 extend downwardly as shown in FIG. 4. At its lower end, the guide surface 85 merges with the upper surface of the wall 70. At this point, wall 87 terminates to provide a forward facing exit 91 to passage 89. A supporting tray 86 is disposed horizontally beneath each of the holes 82 for supporting the optical transmission elements 25 as they extend from a respective cable 12 to each of the mounting stations 16.

To connect optical fibers of a transmission element into its respective connector 34, the following procedure is followed. In respect of each of the mounting positions 16 and with the organizing tray 18 removed from the termination shelf 14, an appropriate optical transmission element or elements 25 is positioned along its respective tray 86 until it reaches the corresponding hole 82. The transmission element is then fed through the hole 82 by an operator standing at the front of the frame and the transmission element is guided along the passage 80 until it reaches the passage 89. The passage 89 then proceeds to guide the transmission element downwardly while forcing it along a curved path as the transmission element continues to be fed into the hole 82, until the leading end of the transmission element faces from the rear of the shelf 14 and of the frame in a forward direction and emerges from exit 91. Continued insertion of the transmission element results in the leading end of the transmission element moving out from the front of the shelf and of the distribution frame. When a sufficient length of the transmission element 25 has been fed from the front of the frame to be mounted into the respective tray, in a manner now to be described, the feeding of the transmission element through the guide means ceases. The relative positions of the parts at this stage are as shown in FIGS. 4 and 8.

When the tray 18 is located outwardly from the shelf 14 and at the front of the frame 26, i.e. in a non-operative position, the transmission element 25 is then passed through the gaps 54 in the retainer 52 and is wound around the cylindrical surface 50 of the member 48 in the storage compartment. At this stage, the coiled form of the transmission element is relatively small and lies closely against the cylindrical surface 50 of the member 48 (FIG. 9). The transmission element 25 is then fed through the slit 56 to bring it into the storage compartment 46. The slit is inclined along wall 28 so that the transmission element curves smoothly from the housing region 44 to the storage compartment while exceeding the minimum bend radius for the element. The transmission element then passes around the guide 58. In the region of the guide 58 and the slit 56 is provided a strain relief for the transmission element 25. This strain relief is provided by a slit 57 in alignment with slit 56 and into the edge of the partition 42. As shown by FIG. 5, the slit 57 is narrower than slit 56 so as to grip and deform slightly inwardly the flexible protective tube of transmission element 25. This is clear from FIG. 5 in which the transmission element is shown in chain-dotted outline being inserted into slit 57, and in full outline within the slit when the tube of the transmission element is inserted into and is gripped by the slit 57 this prevents lengthwise movement of the transmission element at this point.

Upon the transmission element emerging from the other end of the guide 58, the tube of the transmission element is removed to expose the fibers 76. These fibers are then passed in coiled form around the member 60 in the storage compartment so as to store excess lengths of fiber for future use if required. The fibers 76 then pass through the gap 64 to the splicing region 61 at which they are individually spliced, by splices 62, to the pigtail fibers 36 of the pigtail assemblies. As shown in FIG. 3, the bare pigtail fibers then pass through the gap 66 and also progress in coiled form around the member 60 in the storage compartment before passing through the wall 38 to the connectors 34. While FIG. 4 shows the complete arrangement of fibers, for clarification purposes FIG. 6 shows the positions of the fibers 76 only and FIG. 7 shows the positions of the pigtail fibers 36 only.

When a tray 18 is used in a termination shelf 14 mounted in the distribution frame 10 of FIG. 1, ends of the patch cords 22 are connected to the front ends of the connectors 34, by passing them upwardly through a gap 88 in wall 30 between the walls 27 and 32 (FIG. 3). Alternatively, when a tray 18 is used in a termination shelf mounted in the frame 26 of FIG. 2, optical fibers of the customer's own internal network and housed in flexible protective tubes 90 are connected to the connectors 34 in similar manner.

With the tray 18 construction therefore, as can be seen from the above description, a compact arrangement is provided in which a single storage compartment houses both the incoming fibers 76 and the outgoing fibers 36 side-by-side around the member 60. Because two compartments are not required for this operation, then the size of the tray 18 is minimized in this respect. Further to this, because the storage compartment and the housing region lie side-by-side and are separated by the partition wall 42, then this further adds to the compactness of the design of the tray 18 with the planes of the coils in the two compartments lying substantially parallel with the coils axially side-by-side.

While the above description for insertion of the transmission elements relates to an optical fiber cable, nevertheless the insertion method for insertion of frontally mounted cable could be used for pairs of electrical conductors in an electrical transmission cable. Thus, the frontal access provided by the termination shelf and thus by the distribution frame is also applicable for use with electrical telecommunications cables.

Upon the transmission element having been inserted into the tray 18 as described above, and with its fibers 76 interconnected with the pigtail fibers 36, it then becomes a relatively simple matter to insert the tray into its mounting position 16. As can be seen from a comparison of FIGS. 9 and 12 of the application, as each tray 18 is moved into its mounting position, as shown in FIG. 12, the inward movement is accompanied by relative movement between the tray and the transmission element 25 extending through the termination shelf 14. Thus, the transmission element moves progressively through an inlet 89 provided in the end wall 26 and into the housing region. Because the transmission element cannot move through the strain relief provided in the tray, then this extra length of transmission element within the storage region may only be accommodated by an increase in size of its coiled form around the member 48. Thus the coils expand radially within the housing region by movement away from the cylindrical surface 50. As can be seen from a comparison of FIGS. 9 and 12, in FIG. 9 the coils lie substantially close to the surface 50 of member 48 and in FIG. 12 the coils have expanded outwards towards the surrounding walls 26, 28, 30 and 38. Should it be required to remove any particular tray from a termination shelf 14 in the distribution frame, then it is simply necessary to move the tray outwardly once more to the non-operative position shown in FIG. 9. During this movement, and as the transmission element is held in the guide within the termination shelf, then the transmission element is released through the inlet 89 so that the coils again reduce in size and move towards the cylindrical surface 50. Upon the tray being removed from the termination shelf, the housing region 44 is accessible for maintenance purposes. The storage and splice compartments are also accessible.

It will be appreciated therefore that with the above-described connection tray, an extremely compact design is formed. In addition, it is easily removed from within the termination shelf 14 for maintenance purposes while the shelf 14 itself is also designed to allow for ease of access from the front of the shelf whereby there is no need for the operator to be positioned at the rear of the shelf for assembling incoming cable. For this reason, the shelf may be mounted into a frame 10 or 26 which is attached directly upon a wall thereby saving space. Alternatively, the shelf may be mounted directly up against a wall.

In another arrangement of equipment frame 100, shown in FIG. 13, termination shelves 102 of a second embodiment are stacked vertically in two spaced columns with the shelves in each column lying one above another so that each mounting position (not shown) lies in a horizontal instead of in a vertical plane as in previous figures. The termination shelves 102 are basically of the same structure as the shelves 14 except that trays 20 are not required because of the vertical configuration.

In the arrangement of FIG. 13, connection trays 18 are fed laterally of the frame 100 into their mounting positions. With this configuration, incoming transmission elements are passed laterally of the frame through holes 82 into the guide means of each shelf, the guide means extending laterally of the frame from one side of the shelf, i.e. at the openings to the mounting positions to the remote side of the shelf.

What is claimed is:

1. A termination shelf for telecommunications cable, comprising a first side and a second side remote from the first side, mounting positions for mounting a plurality of conductor connector means in mounting positions in the shelf with access to said first side, and a plurality of guide means, one for each mounting position, each guide means having first and second in-series guide parts and in each of which:

the first guide part extends from the first side towards the second side of the shelf for guiding a flexible telecommunications cable transmission element positioned at the first side and fed into the first guide part along a fixed path through the shelf towards the second side; and the second guide part is in-series with the first guide part to receive the transmission element from the first guide part, the second guide part being curved so as to guide the transmission element along a curved path and through a corresponding mounting position towards the first side of the shelf.

2. A termination shelf according to claim 1 mounted within a distribution frame having a front and a rear and with the first side of the shelf positioned at the front of the frame and with the first guide part extending towards the rear of the frame.

3. A termination shelf according to claim 1 mounted within a distribution frame having a front, a rear and two sides, the shelf being disposed so that the two sides of the shelf are spaced in a direction between the sides of the frame.

4. A termination shelf according to claim 1 wherein each mounting position is provided by a chamber within the shelf, the chamber having an access opening at said first side of the shelf, the first guide part comprising a first wall extending from said first side towards the second side of the shelf, and the second guide part comprising a second wall located towards the second side of the shelf, the first and second walls separating the chamber from a guide passage for the flexible cable transmission element except for an outlet from the guide passage at a end of the second wall into the chamber with the outlet facing forwardly towards the first side of the shelf.

5. A termination shelf for telecommunications cable and a plurality of conductor connector means, the shelf comprising a first side and a second side remote from the first side and mounting positions for mounting the plurality of conductor connector means in mounting positions in the shelf by sliding reception of the conductor connector means into the mounting positions through an access opening at said first side, the shelf also comprising a plurality of guide means, one for each mounting position, each guide means having first and second in-series guide parts and in each of which:

the first guide part extends from the first side towards the second side of the shelf for guiding a flexible telecommunications cable transmission element positioned at the first side and fed into the first guide part along a fixed path through the shelf towards the second side; and the second guide part is in-series with the first guide part to receive the transmission element from the first guide part, the second guide part being curved so as to guide the transmission element along a curved path and through a corresponding mounting position towards the first side of the shelf.

6. A termination shelf and a plurality of conductor connector means according to claim 5 wherein each mounting position is provided by a chamber within the shelf, the chamber having an access opening at said first side of the shelf, the first guide part comprising a first wall extending from said first side towards the second side of the shelf and the second guide part comprising a second wall located towards the second side of the shelf, the first and second walls separating the chamber from a guide passage for the flexible cable transmission element except for an outlet from the guide passage at an end of the second wall into the chamber with the outlet facing forwardly towards the first side of the shelf.

7. A termination shelf and a plurality of conductor connector means according to claim 6 wherein another wall is provided for each chamber, said other wall spaced across the chamber from and opposed to the first wall for the sliding reception of a corresponding conductor connector means between the first and the other walls and into the chamber.

* * * * *